United States Patent [19]
Iacobucci et al.
[11] Patent Number: 4,843,690
[45] Date of Patent: Jul. 4, 1989

[54] MORTICIAN'S PORTABLE RACK

[76] Inventors: Anthony M. Iacobucci, 5308 Timberhollow La., Cincinnati, Ohio 45247; Donald E. Douthit, 12004 Gaylord Dr., Cincinnati, Ohio 45240

[21] Appl. No.: 235,460

[22] Filed: Aug. 24, 1988

[51] Int. Cl.[4] .......... A01N 1/00

[52] U.S. Cl. .......... 27/21.1; 269/327

[58] Field of Search .......... 27/21.1, 23.1; 269/322, 269/325, 327, 328; 128/845; 604/356

[56] References Cited

U.S. PATENT DOCUMENTS

| | | | |
|---|---|---|---|
| 943,827 | 12/1909 | Hennessy | 269/327 |
| 1,746,950 | 2/1930 | Leonard | 269/327 |
| 1,796,493 | 3/1931 | Thompson | 269/327 |
| 1,900,255 | 3/1933 | Ormsbee | 269/327 |
| 1,960,392 | 5/1934 | Ormsbee | 27/23 |
| 2,041,087 | 5/1936 | Ocasek | 269/327 |
| 2,465,781 | 3/1949 | Banta | 311/11 |
| 2,502,765 | 4/1950 | Turley | 27/21 |
| 2,618,041 | 11/1952 | Nelson | 27/13 |
| 3,034,843 | 5/1962 | Moon | 269/322 |
| 3,234,623 | 2/1966 | Rector | 27/21.1 |
| 3,751,028 | 8/1973 | Scheininger et al. | 269/328 X |
| 3,799,534 | 3/1974 | Coles | 269/32 B |
| 4,617,706 | 10/1986 | Waletzko | 27/28 |

*Primary Examiner*—Robert A. Hafer
*Assistant Examiner*—Sam Rimell
*Attorney, Agent, or Firm*—Charles R. Wilson

[57] ABSTRACT

A mortician's rack for use on an embalming table is disclosed. The rack is portable in nature in that it can be readily removed from the embalming table when not needed and stored, thereby freeing the table for other uses. The rack comprises a main frame with substantially parallel side rails and end rails. A head rest is secured to one end of the main frame and a moveable foot rest secured to a second end of the main frame. A lumbar platform capable of lateral movement is positioned near the mid-section of the side rails. A series of cross-bars are mounted on the side rails with certain cross-bar capable of being independently moved in a lateral direction. The cross-bars are positioned depending on the length of the deceased being embalmed to ensure that it is fully supported and that collateral circulation is not impaired during the embalming process. The rack further comprises at least four leg extensions capable of being vertically adjusted to accommodate different work height requirements.

16 Claims, 2 Drawing Sheets

MORTICIAN'S PORTABLE RACK

The invention relates to a portable rack for use by morticians. More particularly, the invention relates to a mortician's portable rack intended to be used on an embalming table as an aid in an embalming process.

An important part of an embalming process is the removal of blood from the deceased and replacement of it with arterial embalming fluid. The arterial embalming fluid is introduced into the deceased through any one of several arteries that is easily accessed by a small incision. The embalming fluid is distributed through the vascular system of the corpse by an electrically driven pump. Injection of the embalming fluid is continued until thoroughly distributed as evidenced by the disappearance of skin surface discoloration and changes in the skin's texture.

All the blood in a deceased is not directly connected to the arterial system. Collateral circulation of blood by way of anastomosis of arteries supplant direct blood circulation in certain parts of the human anatomy. In fact, there are several areas of collateral circulations well known to those skilled in the mortuary sciences.

A particular concern of the mortician in the embalming process is the blockage or isolation of those areas of the body served by collateral circulation. Thus, the deceased's own weight on a portion of an underlying hard table top surface can impair the collateral circulation in that part of the body making contact. Various positionings and shiftings of the deceased throughout the process can be done and does alleviate the problem to a degree. As can be imagined, such procedures are time-consuming and are cumbersome.

There is a need for a mortician's rack which is convenient to use. Any such rack must be relatively inexpensive to produce, yet must be able to serve the needs of the mortician during the embalming process. In particular, the rack must be capable of alleviating collateral circulation problems existent with most embalming tables. There has now been developed a mortician's rack which meets known needs.

SUMMARY OF THE INVENTION

A mortician's portable rack comprises a main frame dimensioned to fit onto an embalming table. The main frame has two substantially parallel side rails and two end rails connecting the side rails. At least four leg extensions are attached to the main frame for the purpose of vertically adjusting the height of the rack depending on the particular embalming table being used. A head rest is positioned on one end of the main frame and a laterally adjustable foot rest is positioned on the other end. A lumbar platform and series of cross-bars extend across the side rails. The lumbar platform and the cross-bars near the foot of the rack are mounted such that they can be laterally moved to positions in accordance with the length of the deceased being embalmed. Further adjustment of the lumbar platform and cross-bars ensures that collateral circulation in the deceased is not substantially impaired.

DETAILED DESCRIPTION OF THE INVENTION

Figure 1:
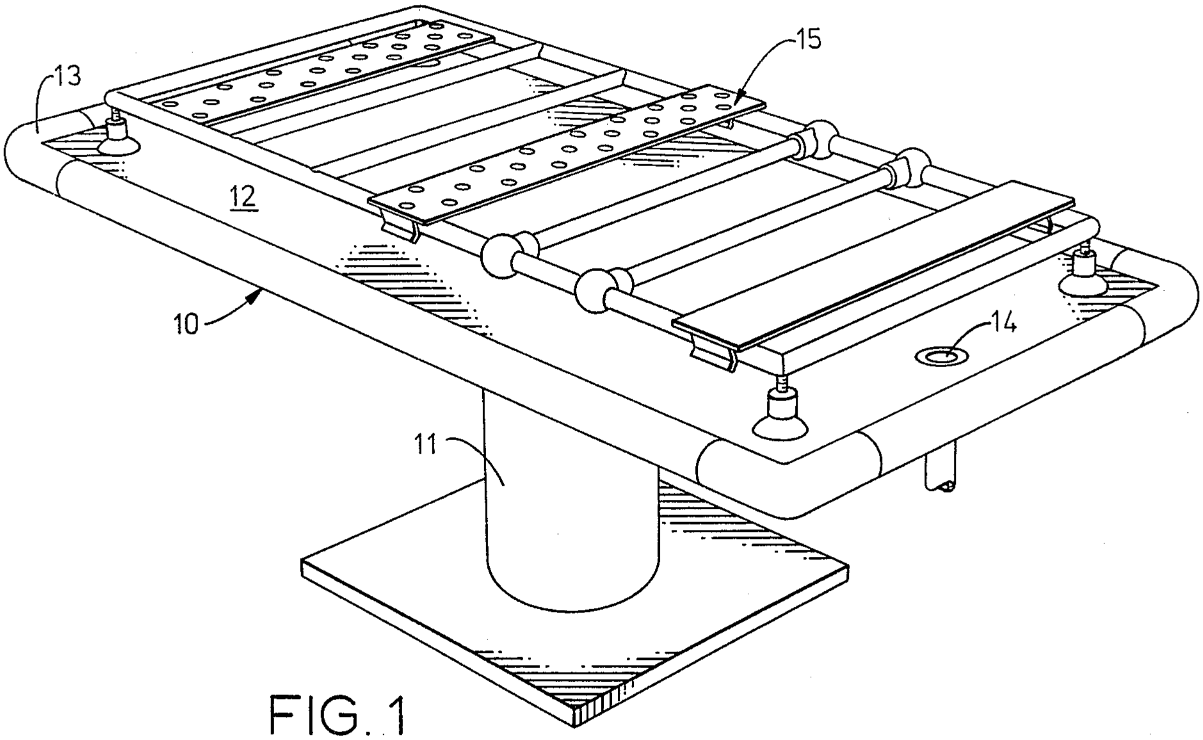
FIG. 1 is a view in perspective of the mortician's portable rack of this invention when placed on an embalming table.

With reference to the drawings and FIG. 1 in particular the portable rack of the invention is illustrated in conjunction with an embalming table. The embalming table illustrated generally as 10 is exemplary of tables which are commercially available and widely used. Thus, embalming table 10 comprises a base 11 with a generally rectangular upper support surface 12. This upper surface has a lip 13 around its periphery. The surface itself is usually not level to aid in the flow of liquids from the table. As shown, the upper support surface 12 has a drain hole 14 provided near one end. Drain lines (partially shown) lead from the drain hole to a waste drain. Alternatively, the table can have a generally convex or concave support surface for drainage purposes. In such tables, a drain hole is provident at a lower-most portion of the table or there is provided a peripheral trough adjoining the lip with a drain hole.

The portable rack shown generally as 15 in FIG. 1 is dimensioned to fit onto the embalming table and is capable of holding a deceased. The rack is portable in that it can be readily removed from the embalming table when not needed and stored in a horizontal or upright position until again needed. The rack itself is lightweight and easily transportable.

Figure 2:
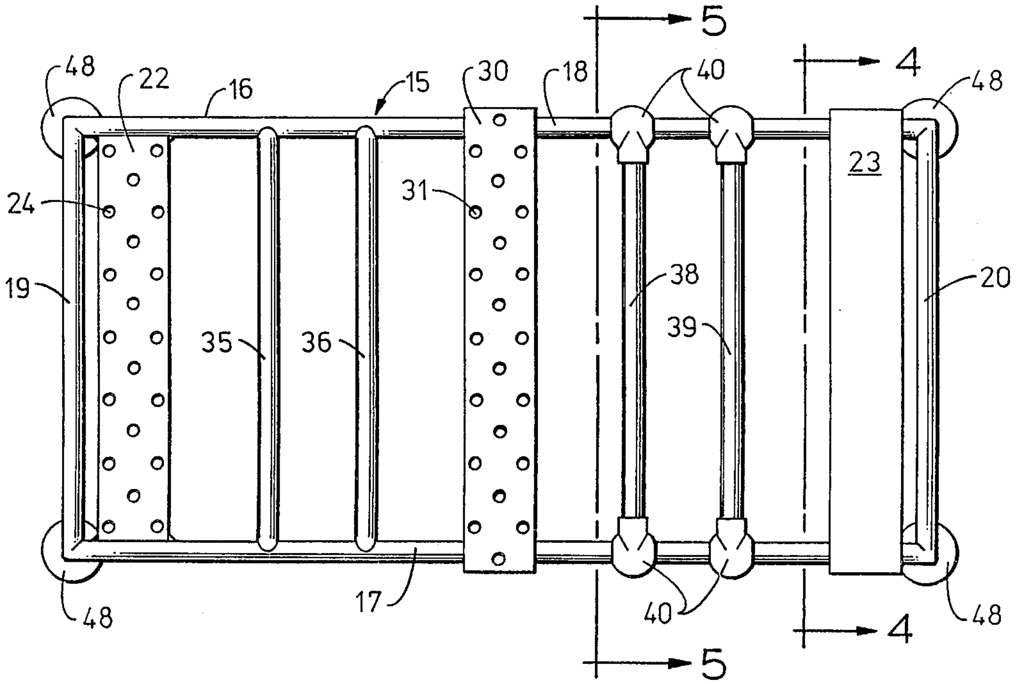
FIG. 2 is a top view of the portable rack of FIG. 1.
Figure 3:
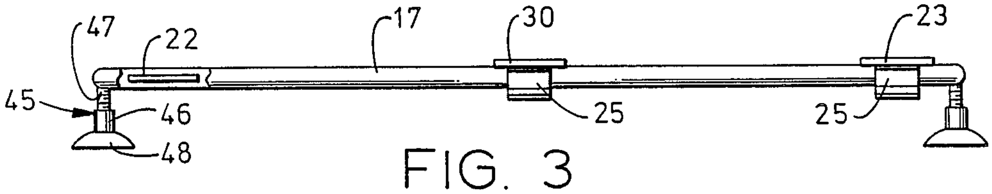
FIG. 3 is a side view of the portable rack of FIG. 1.

With regard to FIGS. 1-3, the rack 15 comprises a main frame 16. The main frame has two substantially parallel side rails 17 and 18 and end rails 19 and 20 which connect the side rails at their extremities. The main frame is generally rectangular with its dimensions less than, but approximating that of the embalming table's upper support surface. The side and end rails are preferably tubular in shape to reduce the overall weight of the rack. A formaldehyde-resistant material such as stainless steel or plastic e.g., polyvinyl chloride is used in manufacturing of the rails.

The portable rack also comprises a head rest 22 positioned at a first end of main frame and a foot rest 23 positioned at a second end of the main frame. The head rest is generally planar. It is permanently attached by conventional attachment means, e.g., welds or bolts and nuts to the frame assembly. The head rest's purpose is to maintain the deceased's head in a steadied position which is readily accessible by the mortician. The platform has a series of drain holes 24 leading through the base to the embalming table's upper surface.

Figure 4:
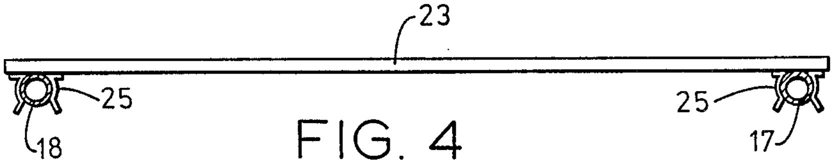
FIG. 4 is an enlarged view taken along line 4—4 of FIG. 2, showing clamp means on the foot rest.

The foot rest 23 positioned on the second end of the main frame is capable of being repositioned along side rails 17 and 18 of the frame assembly. Preferably, the foot rest is rectangular-shaped with a planar surface which extends from side rail 17 to side rail 18. As best seen in FIG. 4, at least two and preferably four clamp-type fasteners 25 are positioned on the bottom surface of the platform. The fasteners are yieldable means shaped to frictionally engage the side rails. The fasteners hold the foot rest in place during use, yet allow the platform to be readily removed and repositioned or slid along the side rails of the frame assembly. Lateral movement of the foot rest is provided to accommodate different deceased lengths. Thus, while the head rest 22 is fixed in location, the foot rest 23 is moved as needed.

Lumbar platform 30 comprised of a generally rectangular planar surface is also provided. This platform is also capable of being repositioned along the side rails depending on the deceased's length. The platform has drain holes 31 and fastener means of the same general type discussed above with respect to the foot rest.

At least three cross-bars and preferably from four to ten cross-bars are mounted on the side rails. Cross-bars 35 and 36 mounted on the side rails between the head rest 22 and lumbar platform 30 are fixed and are preferably equi-spaced to support the deceased. As apparent from FIG. 1, an underside of the deceased resting on cross-bars 35 and 36 is readily accessible. Thus, the mortician can easily reach those areas of the deceased resting on the cross-bars for manipulation to aid in the embalming process, particularly where collateral circulation problems exist.

The individual cross-bars 38 and 39 between the lumbar platform and foot rest platform are positioned during use depending on the corpse's length. The process of replacing blood with arterial embalming fluids is impaired by excess body weight pressure at certain contact points. By properly positioning the cross-bars any collateral circulation in the deceased is not impaired. The bars are preferably made of the same material as the rails as above discussed and are preferably hollow for weight reduction purposes.

Figure 5:
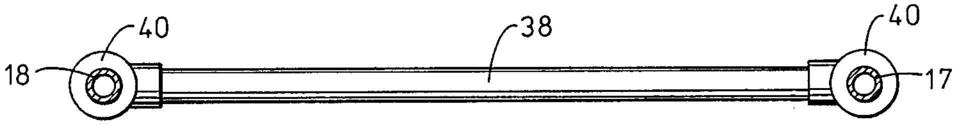
FIG. 5 is an enlarged view taken along line 5—5 of FIG. 2 showing attachment means for a movable cross-bar.
Figure 6:
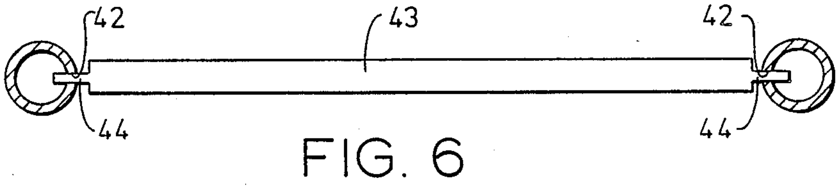
FIG. 6 is an end view of an alternative means for movably mounting the cross bars on the main frame.

Cross-bars 38 and 39 are movably mounted on the side rails 17 and 18 by use of mounting attachments 40. The mounting attachments are initially secured to each extremity of each cross-bar. Various attachment means are usable. Thus, as shown in FIG. 5, each of the mounting attachments 40 is a generally T-shaped hollow body wherein a cross-bar extremity fits into an open extremity of one leg and is secured thereto and the side rail passes through the other leg. The side rails and interior diameter of the attachments are dimensioned to allow the side rails to slide therein. Alternatively, as in FIG. 6, the side rails have a groove 42 along an inside surface and the cross-bar 43 has a tongue 44 at each end which rides in the side rail grooves 42.

Leg extensions 45 are positioned on the rails of the main frame near each of the frame's four corners. Preferably each leg extension is attached at each side rail's extremity for maximum support. The leg extensions are capable of being lengthened up to about four inches, preferably from about one to about three inches. For this purpose the leg extensions comprise an outer tubular member 46 which is internally threaded and threaded rod 47. The threaded rod moves in the outer tubular portion by mere turning to either lower or raise the frame assembly. Each leg extension is independently adjusted according to need. Normally, the two leg extension at the head rest platform end are higher than the legs at the foot rest platform end. Feet 48 are secured to the ends of each leg extension 45 for stability purposes.

Figure 7:
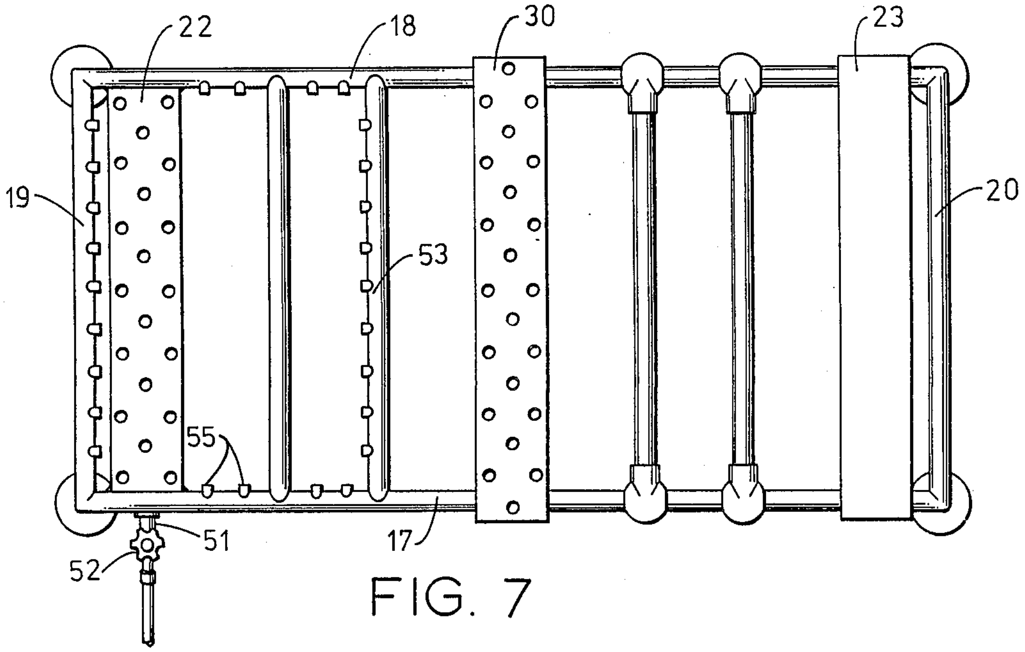
FIG. 7 is a top view of another embodiment of a mortician's portable rack of the invention showing water clean-up means built into the rack.

An optional feature found in a preferred embodiment of the invention is control means for supplying water to the portable rack for clean-up purposes. Thus, with reference to FIG. 7 a hose connection 51 with valve 52 is provided in a wall of one of the main frame's rails. A cross-rail 53 extends from side rail 17 to side rail 18 and is positioned between the head rest 22 and lumbar platform 30. End rail 19, side rail 17, cross-rail 53 and side rail 18 in this embodiment must be hollow and their interiors interconnected. Additionally, each rail has a series of water holes with nozzles 55 along an inside surface. The nozzles are so positioned that sprays of water flowing though them will be directed onto the embalming table. The water valve 52 at the hose connection is used for regulating the flow of water. Preferably, the valve is a Y-valve with means for a separate hose connection.

In operation, the mortician's portable rack of this invention is moved from its place of storage and placed on an embalming table. The leg extensions are adjusted until a desired working height is attained. Next, the deceased is placed on the cross-bars of the rack. The lumbar platform, foot rest and movable cross-bars are individually moved along the side rails to locations such that the entire body of the deceased is supported. Further movement of the aforementioned components ensure that the deceased's own weight will not substantially impair collateral circulation during the embalming process. Once the embalming operation is concluded, the rack is cleaned and stored for subsequent use, thus freeing the embalming table for other uses.

While the invention has been described with reference to the drawings, obvious changes and modifications can be made. All such changes and modifications are within the scope of the following claims.

What is claimed is:

1. A mortician's portable rack for use on an embalming table, said rack comprising:

(a) a main frame having two substantially parallel side rails and two end rails;

(b) at least four leg extensions attached to the main frame, said leg extensions capable of being vertically adjusted to accommodate different height requirements;

(c) a head rest secured to a first end of the main frame, said head rest having a series of drain holes for fluids;

(d) a lumbar platform positioned in the mid-section of the main frame, said platform capable of being laterally moved along the side rails to a desired position;

(e) an adjustable foot rest positioned on a second end of the frame, said foot rest capable of being laterally moved along the side rails of the main frame to accommodate different deceased lengths; and (f) a series of cross-bars extending from one side rail to the other side rail, wherein each of said cross-bars mounted on the side rails between the lumbar platform and the foot rest is independently capable of lateral movement along the side rails to positions underneath a deceased to support said deceased and to ensure that collateral circulation in the deceased is not substantially impaired.

2. The portable rack of claim 1 wherein from three to ten cross-bars are mounted on the side rails of the main frame.

3. The portable rack of claim 2 wherein at least two cross-bars are fixedly mounted on the side rails between the head rest and the lumbar platform and at least two cross-bars are movably mounted on the side rails between the lumbar platform and the foot rest.

4. The portable rack of claim 1 wherein all the cross-bars are capable of lateral movement on the side rails.

5. The portable rack of claim 4 wherein the cross-bars each have a cylindrical-shaped fitting attached to each end.

6. The portable rack of claim 1 wherein the leg extensions are capable of being lengthened up to about four inches.

7. The portable rack of claim 6 wherein each leg extension is comprised of an internally threaded tubular member and a threaded rod to move therewithin for height adjustment purposes.

8. The portable rack of claim 1 wherein the rails of the main frame and the cross-bars are made of a formaldehyde-resistant material.

9. The portable rack of claim 8 wherein the rails of the main frame and the cross-bars are made of a plastic material.

10. The portable rack of claim 9 wherein the plastic material is a polyvinylchloride.

11. The portable rack of claim 8 further wherein a series of water holes are positioned along inside surfaces of at least a portion of the rails so as to provide sprays of water for clean-up purposes when needed.

12. The portable rack of claim 11 further having a cross-rail positioned on the side rails between the head rest and the lumbar platform and wherein the end rail at the head rest end, those portions of the side rails between said end rail and said cross-rail, and the cross-rail all have the water holes.

13. The portable rack of claim 12 wherein the interior of the rails are interconnected and further wherein a water hose connection means is provided on a rail so that a flow of water can be supplied to the main frame such that it flows into the rails, circulates therethrough and exits through the water holes.

14. The portable rack of claim 13 further wherein a flow control valve is in operable association with the hose connection means.

15. The portable rack of claim 1 wherein the foot rest is completely removable.

16. The portable rack of claim 3 wherein the cross-bars are hollow.

* * * * *